(12) United States Patent
Oh

(10) Patent No.: US 6,190,178 B1
(45) Date of Patent: Feb. 20, 2001

(54) REMOTE EDUCATION AND APPARATUS VIA AN INTERNET

(75) Inventor: Min Seok Oh, Seoul (KR)

(73) Assignee: Samsung Electronics Co., Ltd., Kyungki-Do (KR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/956,462

(22) Filed: Oct. 23, 1997

(30) Foreign Application Priority Data

Oct. 23, 1996 (KR) .................................. 96-47807

(51) Int. Cl.[7] ........................................ G09B 7/00
(52) U.S. Cl. ...................... 434/323; 434/322; 434/350; 434/362
(58) Field of Search .................... 434/118, 350, 434/362, 335, 322, 323

(56) References Cited

U.S. PATENT DOCUMENTS

| 4,636,174 | * | 1/1987 | Andersen et al. | 434/335 |
| 5,310,349 | * | 5/1994 | Daniels et al. | 434/350 |
| 5,727,950 | * | 3/1998 | Cook et al. | 434/350 |

FOREIGN PATENT DOCUMENTS

| 8-249387 | 9/1996 | (JP) | G06F/17/60 |
| WO97/36233 | 2/1997 | (WO) | G06F/12/00 |

OTHER PUBLICATIONS

Denshi Joho Tsushin Gakkai Gijutsu Kenkyuu Hokoku, vol. 96, No. 148, Published Jul. 13, 1996, p. 15–19, 89–96.
NTT R&D, vol. 45, No. 2, Published Feb. 10, 1996, p. 121–128.
Ntt Gijutsu Jya–naru, vol. 7, No. 8. 1995, p. 72–75.

* cited by examiner

Primary Examiner—Valencia Martin-Wallace
Assistant Examiner—Chanda Harris
(74) Attorney, Agent, or Firm—Sughrue, Mion, Zinn, Macpeak & Seas, PLLC

(57) ABSTRACT

A remote education method and apparatus via an internet which has been widely used as an information network is provided. The remote education method and apparatus via the internet has an open structure which is not influenced by particular hardware or software, such as an operating system or a web browser. A remote education provider can construct a remote education server with a low cost in a minimum amount of time. Also users can easily connect to the remote education server via the internet to receive a remote education service. The remote education server provides an educational program including individual learning progress based on a learning evaluation and a performance management function and performs a discriminative education based on the ability of each individual.

7 Claims, 1 Drawing Sheet

REMOTE EDUCATION AND APPARATUS VIA AN INTERNET

BACKGROUND OF THE INVENTION

The present invention relates to a remote education method and apparatus via an internet.

A generally known remote education method is performed by an educational broadcast over a radio wave or a cable to a television at a predetermined time. Another remote education method is performed using video media. This video media method is carried out in a video conferencing system, in which a teacher and a student view each other via the video media. Still another remote education method is performed through a general network, in which a dedicated videophone system and a whiteboard system, which can share data via computers linked via a local area network (LAN) or a wide area network (WAN), are used to instantly communicate video and graphic data across the network.

However, the above-described conventional remote education methods cause users to be restricted by time and location. Also, it is difficult to increase the number of users and prepare a variety of educational contents. Further, the learning results of individual users have not been evaluated and managed.

SUMMARY OF THE INVENTION

To solve the above problems, an object of the present invention is to provide a remote education method via an internet that evaluates, analyzes and manages individual learning and educational results.

To accomplish this object, a remote education method has been developed using an internet that comprises the steps of:
(a) receiving a user name and password and identifying whether the user name and password are listed in a registered user list;
(b) transmitting a remote education home page that contains a menu for requesting the registered user to input personal information and learning procedures for guiding the user to select one of the desired learning procedures;
(c) providing learning data corresponding to the learning procedure selected by the user;
(d) providing evaluation data, corresponding to the provided learning data, to evaluate a user's learning results;
(e) analyzing the evaluation results with respect to the evaluation data and providing a learning direction to the user; and
(f) individually storing remote educational result information of the user, such as the evaluation results and the learning direction based on the evaluation results.

Another object of the present invention is to provide an apparatus for performing a remote education method via an internet which includes a server, executing a remote education program and a personal computer, which is connected to the server, to receive the remote education information.

To accomplish this object a remote education apparatus via an internet has been designed comprising:
a personal computer (PC) which can be connected to an internet; and
a server for prestoring a variety of learning data and evaluation data corresponding to the learning data and providing the learning data and the evaluation data to the PC of a registered user.

DETAILED DESCRIPTION OF THE PREFERRED EMBODIMENT

Figure 1:
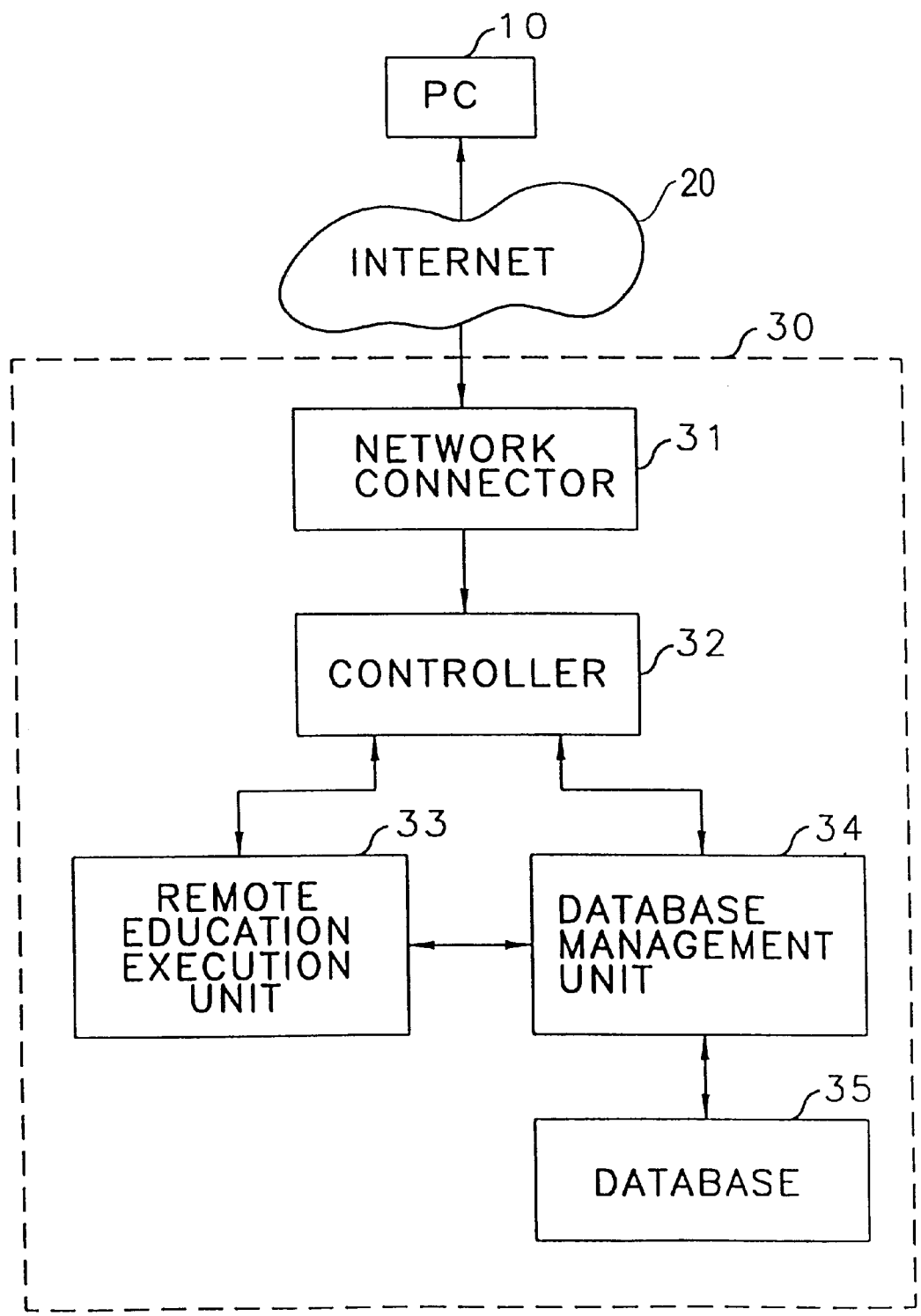
FIG. 1 is a block diagram showing a remote education apparatus via an internet according to a preferred embodiment of the present invention.

A preferred embodiment of the present invention will be described with reference to the accompanying figure.

A remote education apparatus via an internet 20 includes a personal computer (PC) 10, which is a student unit to which educational information is provided, and a server 30, which is an educator unit from which remote educational information is provided. The server 30 includes a network connector 31 which is connected to an internet host computer.

A controller 32 controls respective units so that remote education is performed based on user information supplied from the internet host computer via the network connector 31.

A remote education execution unit 33, which is connected via an internet 20, provides a user with learning data and evaluation data, corresponding to the provided learning data, thereby executing a remote education program for analyzing the learning results. A database management unit 34 manages database 35 with respect to the learning contents executed in the remote education execution unit 33.

A database 35 prestores a variety of data with respect to the learning contents, such as learning data and evaluation data.

The remote education execution unit 33 operates by linking with the database management unit 34.

Operation of the apparatus will be described in the following paragraphs. First, server 30 is connected to internet 20 via network connector 31. Controller 32 sets an internet protocol (IP) address and a domain name, which is called an internet site, to enable hosts on internet 20 to connect via the IP or the domain name. A user connects PC 10 to a host on internet 20 and inputs an internet address of server 30. Controller 32 requests the user name and password of the user. Controller 32 determines whether the input user name and password are recorded in a registered user list. If the user is listed in the registered user list, controller 32 transmits a remote education home page to start a remote education program. However, if the user is not listed in the registered user list, a registering page is transmitted. An unregistered user can be listed in the registered user list via the registering page and can then receive a remote education home page.

The remote education home page corresponds to a start page of a remote education program on the internet 20 and contains a menu for inputting personal information of a user listed in the registered user list and learning procedures for guiding the user to select one of the desired learning procedures. The personal user information is used for managing individual learning results. The user selects a desired learning procedure.

Controller 32 controls remote education execution unit 33 and database management unit 34 so that learning data corresponding to the selected learning procedure is provided to PC 10, which is a student, via internet 20. Database management unit 34 searches the learning data corresponding to the learning procedure selected by the user among a variety of learning data stored in database 35 and outputs the search results to remote education execution unit 33.

Remote education execution unit 33 creates an educational page showing the input learning data and provides the educational page to the user. Learning data is provided as moving pictures, still pictures, sounds and the like. If learning is completed, remote education execution unit 33 analyzes the completed learning data and outputs the result to database management unit 34. Database management unit 34 searches the evaluation data corresponding to the learning data analysis results from database 35 and outputs the search result to remote education execution unit 33.

Remote education execution unit 33 creates an evaluation page containing estimation data supplied from database management unit 34 and provides the evaluation page to the user. The user takes a test on the learned contents via the evaluation page. When the test is finished, remote education execution unit 33 receives the test data to evaluate the test results. Remote education execution unit 33 analyzes the evaluation results and sets a learning direction based on the evaluation results. The remote education execution unit 33 transmits a results page showing the evaluation results and the learning direction.

The database management unit 34 receives the remote education result information, such as the evaluation results and the learning direction, from remote education execution unit 33 and stores them in database 35.

Database management unit 34 stores each individual user's remote education result information in database 35, considering the user's personal information input in the remote education home page, so that an individual education based on the ability of each user can be performed discriminatively.

As described above, the remote education method and apparatus via an internet have an open structure which is not influenced by particular hardware or software, such as an operating system or a web browser. A remote education provider can construct a remote education server with a low cost in a minimum amount of time. Also, users connect to the remote education server via an internet to receive a remote education program. The remote education server includes a learning evaluation function and provides learning information to manage individual learning progress and additional educational programs. Thus, the present invention can educate users based on the ability of each individual.

While only certain embodiments of the invention have been specifically described herein, it will apparent that numerous modifications may be made thereto without departing from the spirit and scope of the invention.

What is claimed is:

1. A remote education method using an internet, comprising the steps of:
    (a) transmitting a remote education home page comprising learning procedures for guiding a user to select one of a set of desired learning procedures;
    (b) providing learning data corresponding to the learning procedure selected by the user;
    (c) providing evaluation data corresponding to the provided learning data to evaluate learning results of the user;
    (d) analyzing an evaluation result, with respect to the evaluation data, and providing a learning direction to the user.

2. The remote education method according to claim 1, wherein said step (b) comprises the step of searching the learning data corresponding to the learning procedure selected in the remote education home page among a database which prestores various learning data and providing the search result to the user.

3. The remote education method according to claim 1, wherein said step (c) comprises the step of searching the evaluation data corresponding to the learning data analysis result from a database and providing the search result to the user.

4. The remote education method according to claim 1, wherein said step (d) comprises the step of individually storing the remote education result information, such as the evaluation results and the learning direction based on the evaluation result, considering the user personal information input in the remote education home page.

5. The remote education method according to claim 4, wherein said remote education result information is individually stored and used for measuring progress and managing a next learning procedure.

6. The remote education method according to claim 1, wherein said step (a) comprises the step of receiving a user name and a password from a user and identifying whether the user name and password are listed in a registered user list, and further transmitting registering page to the user when the user name is not listed in the registered user list.

7. A remote education apparatus via an internet, the remote education apparatus comprising:
    a controller;
    a network connector which can be connected to the internet;
    a database for prestoring the various learning data and the evaluation data prestored in the database, for creating a learning page to execute the remote education, an evaluation page to evaluate the learning results and a resultant page with respect to the evaluation, and for performing a remote education program; and
    a database management unit for storing in the database and managing the individual remote education result information, based on the learning results executed in the remote education execution unit, such as evaluation results and a learning direction, based on the evaluation result.

* * * * *